United States Patent
Haba

(10) Patent No.: US 11,741,155 B2
(45) Date of Patent: Aug. 29, 2023

(54) SEARCH SYSTEM

(71) Applicant: KONICA MINOLTA, INC., Tokyo (JP)

(72) Inventor: Kenya Haba, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 288 days.

(21) Appl. No.: 17/336,367

(22) Filed: Jun. 2, 2021

(65) Prior Publication Data
US 2021/0382938 A1 Dec. 9, 2021

(30) Foreign Application Priority Data
Jun. 8, 2020 (JP) .................................. 2020-099344

(51) Int. Cl.
*G06T 7/90* (2017.01)
*G06F 16/583* (2019.01)
(Continued)

(52) U.S. Cl.
CPC .......... *G06F 16/5838* (2019.01); *G06F 16/51* (2019.01); *G06T 7/90* (2017.01); *G06V 30/413* (2022.01); *G06T 2207/10024* (2013.01)

(58) Field of Classification Search
CPC ....... G06F 16/5838; G06F 16/51; G06T 7/90; G06T 2207/10024; G06V 30/413; G06V 30/18105; G06V 30/19107; G06V 30/414
(Continued)

(56) References Cited

U.S. PATENT DOCUMENTS 8,700,601 B2 *  4/2014  Atchison .............. G06F 16/907
                                                            707/711
8,825,670 B2 *  9/2014  Masuko ................ G06V 30/224
                                                            382/229
(Continued)

FOREIGN PATENT DOCUMENTS

JP    H05181961 A    7/1993
JP    2001256256 A   9/2001
(Continued)

OTHER PUBLICATIONS

Copending U.S. Appl. No. 17/339,294, naming Kenya Haba, as inventor and filed Jun. 4, 2021.

*Primary Examiner* — Ali Bayat
(74) *Attorney, Agent, or Firm* — Buchanan Ingersoll & Rooney PC

(57) ABSTRACT

A search system searches a storage where one electronic document or a plurality of electronic documents is/are stored for an electronic document that satisfies an entered search condition. The search system includes a first processor and a second processor. The first processor manages a feature relating to a color shade of the electronic document as an index of the electronic document and retrieves the electronic document that satisfies the search condition from the storage based on the index. The second processor has an electronic document printed. Managing a feature relating to a color shade of the electronic document as an index of the electronic document includes registering the feature relating to the color shade of the electronic document obtained by analyzing the electronic document as the index of the electronic document and updating, when the electronic document is printed, the index of the electronic document.

13 Claims, 18 Drawing Sheets

(51) Int. Cl.
*G06F 16/51* (2019.01)
*G06V 30/413* (2022.01)

(58) Field of Classification Search
USPC .......................................................... 382/165
See application file for complete search history.

(56) References Cited

U.S. PATENT DOCUMENTS

| | | | |
|---|---|---|---|
| 2002/0111960 A1* | 8/2002 | Irons | H04N 1/2166 |
| 2008/0126392 A1* | 5/2008 | Chrisop | G06F 3/1237 |
| | | | 707/999.102 |
| 2009/0244558 A1* | 10/2009 | Megawa | G06T 9/00 |
| | | | 358/1.9 |
| 2013/0151509 A1* | 6/2013 | Tran | G06F 16/9577 |
| | | | 707/723 |
| 2014/0229521 A1* | 8/2014 | Meadway | G06F 16/958 |
| | | | 709/202 |
| 2016/0162752 A1 | 6/2016 | Shibata et al. | |

FOREIGN PATENT DOCUMENTS

| | | |
|---|---|---|
| JP | 2005004724 A | 1/2005 |
| JP | 2016110387 A | 6/2016 |

* cited by examiner

FIG.11

```
                                              ╱─30
┌─────────────────────────────────────────┐
│ FILE NAME : sample.pdf                  │
│   ⋮                                     │
│ <nth PAGE>                              │
│ text1 :─────────────── Cl               │
│   POSITION : UP ─────── Lo              │
│ text2 :                                 │
│   POSITION : UP                         │
│   ⋮                                     │
│ pie graph : ─────────────── Cl          │
│   POSITION : LOWER LEFT ───── Lo        │
│   COLOR    : (R8,G8,B8)───── Co         │
│ photo :                                 │
│   POSITION : LOWER RIGHT                │
│   COLOR    : (R8,G8,B8)                 │
│   ⋮                                     │
└─────────────────────────────────────────┘
```

FIG.13

```
                                           ╱30
┌─────────────────────────────────┐
│ FILE NAME : sample.pdf          │
│ pie graph :                     │
│   POSITION : LEFT               │
│   COLOR    :                    │
│      ⎧ REPRESENTATIVE COLOR 1 ⎫ │
│   Gr ⎨  ·CENTER:(L1,a1,b1)    ⎬Ca│
│      ⎩  ·SIZE :(ΔL1,Δa1,Δb1)  ⎭ │
│      ⎧ REPRESENTATIVE COLOR 2 ⎫ │
│   Gr ⎨  ·CENTER:(L2,a2,b2)    ⎬Ca│
│      ⎩  ·SIZE :(ΔL2,Δa2,Δb2)  ⎭ │
│      ⎧ REPRESENTATIVE COLOR 3 ⎫ │
│   Gr ⎨  ·CENTER:(L2,a2,b2)    ⎬Ca│
│      ⎩  ·SIZE :(ΔL2,Δa2,Δb2)  ⎭ │
└─────────────────∿───────────────┘
```

| SETTING ITEM | COLOR SHADE CHANGE |
|---|---|
| THE NUMBER OF COPIES | × |
| DOCUMENT SIZE | × |
| DOUBLE-SIDED/SINGLE-SIDED | × |
| WATERMARK | ○ |
| DOCUMENT MODE | ○ |
| IMAGE ADJUSTMENT | ○ |
| ⋮ | ⋮ |

SEARCH SYSTEM

The entire disclosure of Japanese Patent Application No. 2020-099344 filed on Jun. 8, 2020 is incorporated herein by reference in its entirety.

BACKGROUND

Technological Field

The present disclosure relates to a search system that searches a storage where one electronic document or a plurality of electronic documents is/are stored for an electronic document that satisfies an entered search condition.

Description of the Related Art

A search system that searches for and retrieves any electronic document from among electronic documents stored in a storage of a file server or the like has been known. A technique based on combination of such a search system and a multi-functional peripheral has also been developed.

Japanese Laid-Open Patent Publication No. H5-181961 discloses a document search apparatus that automatically allows, in searching for a document, use of document type information for each page as one of search elements.

Japanese Laid-Open Patent Publication No. 2001-256256 discloses an electronic document search apparatus including image creation means for developing electronic document data into raster image data, first feature value extraction means for extracting a feature value of the developed raster image data, image obtaining means for obtaining raster image data separately therefrom, second feature value extraction means for extracting a feature value of the obtained raster image data, similarity search means for determining similarity between the feature values, and image identification means for searching for electronic document data based on a result of determination.

Japanese Laid-Open Patent Publication No. 2005-4724 discloses an image processing apparatus that extracts a feature amount of a region to be processed containing a page image contained in a reference comparison image obtained by electronically reading a printed material and retrieves a comparison target image corresponding to the comparison reference image from a recording medium based on the extracted feature amount.

Japanese Laid-Open Patent Publication No. 2016-110387 discloses a search apparatus that searches for a second image based on first element information that is at least one of a category, position, size, shape, and color constituting an input first image.

SUMMARY

In an exemplary scene where a search system is used, a user prints an electronic document stored in a storage and conducts search based on a printed product resulting from printing. In such a case, a color shade may be different between the printed product and the electronic document due to conversion from a colored document to a monochrome document at the time of printing, change in brightness, or color shade reproducibility of a printer.

Japanese Laid-Open Patent Publication No. 2001-256256 discloses an electronic document search apparatus that reads a paper document with a scanner on the premise that the paper document is kept at hand and searches for an electronic document similar to the read document image. In some cases, however, a paper document may not be kept at hand. If a color shade is different between a printed product and an electronic document and if only a feature obtained from the electronic document is registered, the electronic document may not successfully be retrieved with a search condition entered by a user based on his/her image of the printed product.

In view of such circumstances, ability to retrieve, even though a color shade of an electronic document stored in a storage is changed in printing the electronic document, the electronic document based on a search condition entered based on an image of a printed product obtained by printing is required.

To achieve at least one of the abovementioned objects, according to an aspect of the present invention, a search system reflecting one aspect of the present invention searches a storage where one electronic document or a plurality of electronic documents is/are stored for an electronic document that satisfies an entered search condition. The search system includes a first processor and a second processor. The first processor manages a feature relating to a color shade of the electronic document as an index of the electronic document and retrieves the electronic document that satisfies the search condition from the storage based on the index. The second processor has the electronic document printed in accordance with print setting including setting relating to the color shade in printing the electronic document. Managing a feature relating to a color shade of the electronic document as an index of the electronic document includes registering as the index of the electronic document, the feature relating to the color shade of the electronic document obtained by analyzing the electronic document, and updating, when the electronic document is printed, the index of the electronic document based on information on a printed product of the electronic document.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 11 is a diagram showing an exemplary index 30 obtained in analysis with the analysis method shown in FIG. 10.

FIG. 13 is a diagram showing exemplary index 30 obtained in analysis with the analysis method shown in FIG. 12.

DETAILED DESCRIPTION OF EMBODIMENTS

Figure 1:
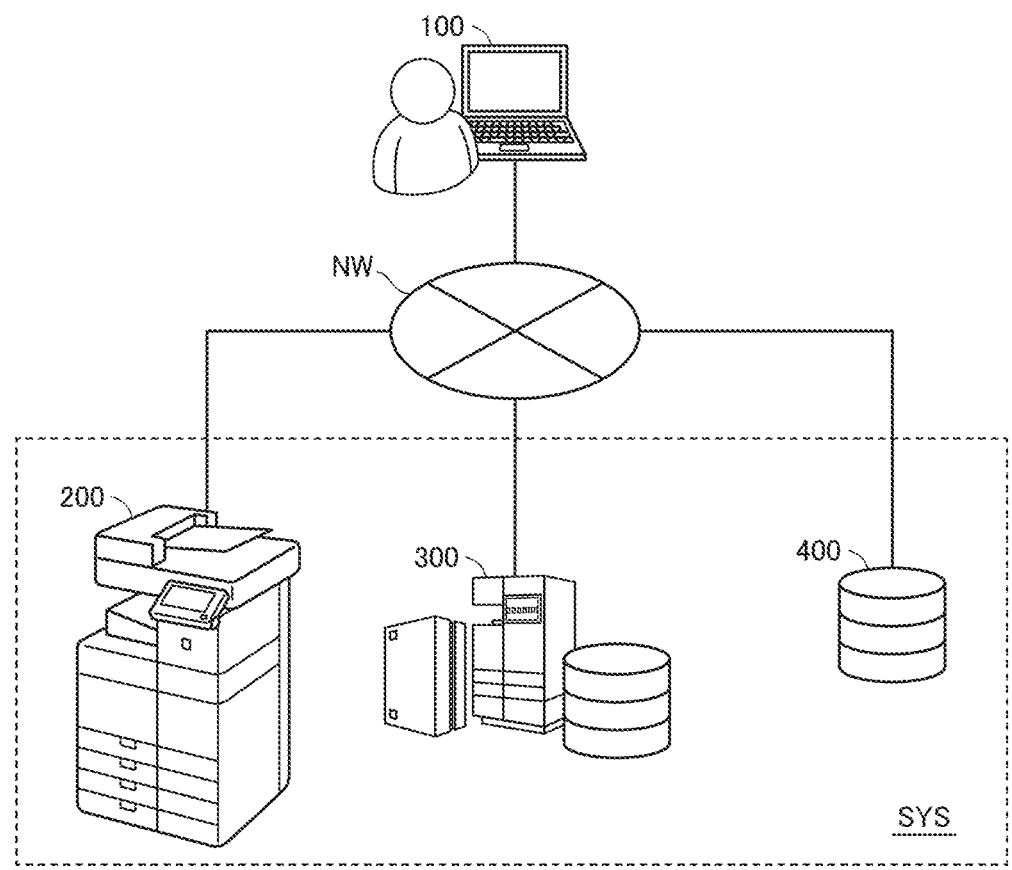
FIG. 1 is a schematic diagram showing an overall configuration of a search system SYS.

Hereinafter, one or more embodiments of the present invention will be described with reference to the drawings. However, the scope of the invention is not limited to the disclosed embodiments.

In the description below, the same elements have the same reference characters allotted and their labels and functions are also the same. Therefore, detailed description thereof will not be repeated.

[Overall Configuration of Search System]

FIG. 1 is a schematic diagram showing an overall configuration of a search system SYS. Search system SYS includes a multi-functional peripheral (MFP) 200, a search server 300, and a file server 400. MFP 200, search server 300, and file server 400 are communicatively connected to one another over a network NW. Search system SYS manages a plurality of electronic documents and retrieves an electronic document that satisfies a search condition from among the managed electronic documents.

MFP 200 is a multi-functional machine of a monochrome printer or a color printer and a scanner. In other words, MFP 200 performs a function as an image forming apparatus that forms an image on a recording medium and a function as a scanner that reads an image of a document.

A plurality of electronic documents are stored in file server 400, and search server 300 searches file server 400 for an electronic document that satisfies an entered search condition. The search condition is entered, for example, from a terminal 100 or MFP 200 capable of communicating with search server 300 over network NW.

Terminal 100 can communicate with search system SYS over network NW. In one aspect, terminal 100 creates an electronic document, has an electronic document stored in file server 400, creates document data obtained by converting an electronic document or the like into page description language (PDL), generates a print job, or transmits a print job in accordance with a program. In another aspect, terminal 100 accepts input of a search condition for searching for an electronic document, transmits the accepted search condition, or shows a result of search.

Network NW may be wired local area network (LAN) such as Ethernet® or wireless LAN such as Wireless Fidelity (Wi-Fi®). A communication scheme is not particularly limited. A scheme for communication between apparatuses may be different. For example, a scheme for communication between terminal 100 and MFP 200 may be different from a scheme for communication between terminal 100 and search server 300.

[Hardware Configuration of Each Apparatus Included in Search System SYS]

Figure 2:
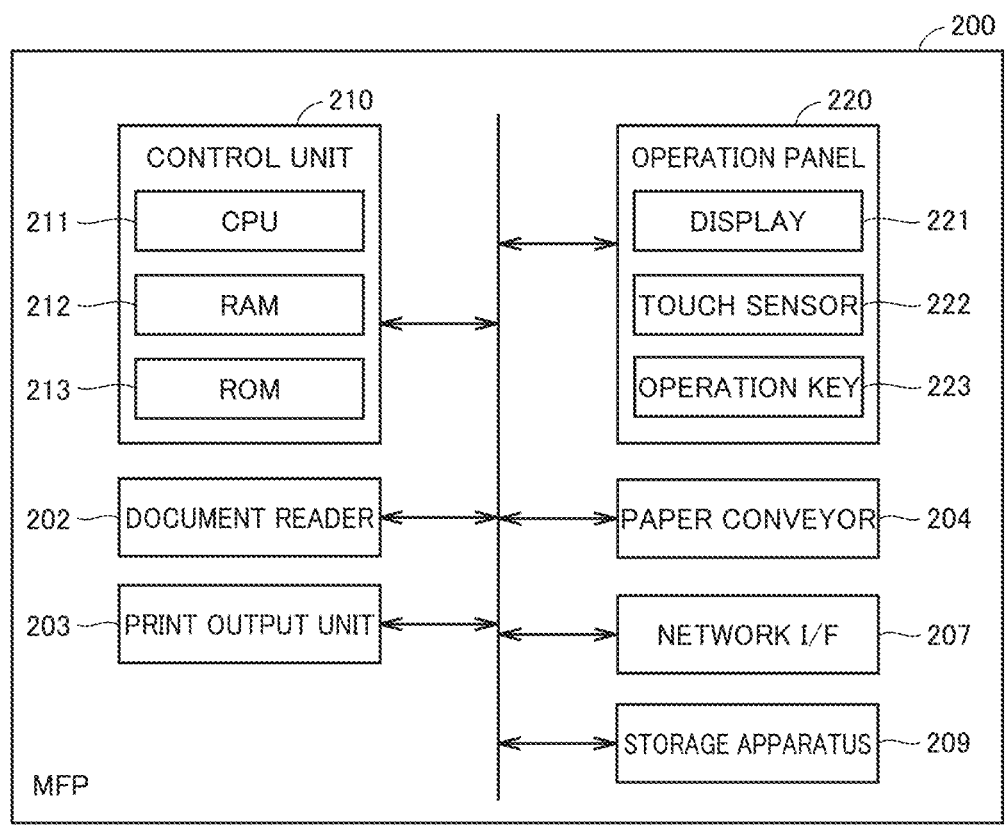
FIG. 2 is a block diagram showing an exemplary hardware configuration of an MFP 200.
Figure 3:
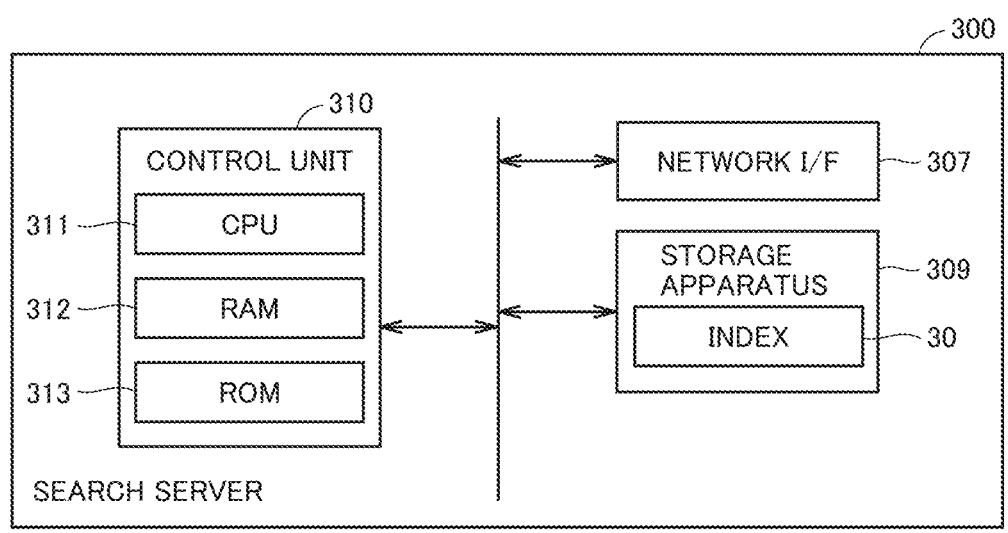
FIG. 3 is a block diagram showing an exemplary hardware configuration of a search server 300.

A hardware configuration of MFP 200 and search server 300 included in search system SYS will be described with reference to FIGS. 2 and 3. FIG. 2 is a block diagram showing an exemplary hardware configuration of MFP 200. FIG. 3 is a block diagram showing an exemplary hardware configuration of search server 300.

(Hardware Configuration of MFP 200)

As shown in FIG. 2, MFP 200 includes, as main components, a control unit 210, a document reader 202, a print output unit 203, a paper conveyor 204, a network interface (I/F) 207, a storage apparatus 209, and an operation panel 220. Elements shown in FIG. 2 are connected to one another through an internal bus.

Control unit 210 includes a central processing unit (CPU) 211, a random access memory (RAM) 212, and a read only memory (ROM) 213. CPU 211 controls operations by MFP 200 by executing a given program. RAM 212 functions as a work area in execution of a program by CPU 211. Various types of data including a program executed by CPU 211 are stored in ROM 213.

MFP 200 may include, instead of or in addition to control unit 210, a dedicated integrated circuit (for example, a field-programmable gate array) used for controlling MFP 200. In MFP 200, control unit 210 and/or the dedicated integrated circuit are/is an exemplary controller that controls operations by MFP 200.

Document reader 202 is implemented by what is called a scanner, and generates image data of a document set in MFP 200 by scanning an image of the document.

Print output unit 203 forms an image based on the image data on recording paper. In one implementation, print output unit 203 includes a photoconductor drum and a transfer roller. Though print output unit 203 forms an image, for example, by electrophotography, a scheme for forming an image is not limited thereto.

Paper conveyor 204 includes a roller for conveying a document and/or recording paper and a motor for rotating the roller in MFP 200.

Network I/F 207 allows communication of MFP 200 with another apparatus over network NW and it is implemented, for example, by a network interface card (NIC).

Storage apparatus 209 is a non-volatile storage apparatus implemented, for example, by a hard disk drive (HDD) or a solid state drive (SSD), and a program and/or data and/is stored therein. Job data may be stored in storage apparatus 209. In other words, control unit 210 may have job data received from terminal 100 over network NW stored in storage apparatus 209, and thereafter may execute a job involved with the job data by reading the job data from storage apparatus 209.

Operation panel 220 includes a display 221, a touch sensor 222, and an operation key 223. Touch sensor 222 covers at least a part of display 221. Display 221 and touch sensor 222 implement a touch panel. Operation key 223 is implemented as a hardware key such as a power key. Control unit 210 provides a signal for showing an image to display 221. In response, display 221 shows various types of information such as an operation screen of MFP 200. Each of touch sensor 222 and operation key 223 provides a signal in accordance with an operation thereonto to control unit 210. Control unit 210 uses signals provided from touch sensor 222 and operation key 223 for controlling MFP 200.

In one aspect, by operating operation panel 220, a user can select an electronic document stored in file server 400, print the selected electronic document, or make setting in printing. In another aspect, by operating operation panel 220, the user can make setting for the scanner, designate where a read document (electronic document) is to be stored, or perform an operation to activate the scanner.

(Hardware Configuration of Search Server 300)

As shown in FIG. 3, search server 300 includes, as main components, a control unit 310, a network I/F 307, and a storage apparatus 309. Elements shown in FIG. 3 are connected to one another through an internal bus.

Control unit 310 includes a CPU 311, a RAM 312, and a ROM 313. CPU 311 performs processing for managing an index 30 used for searching for an electronic document and processing for retrieving the electronic document, by executing a given program. RAM 312 functions as a work area in execution of a program by CPU 311. Various types of data including a program executed by CPU 311 are stored in ROM 313.

Search server 300 may include, instead of or in addition to control unit 310, a dedicated integrated circuit (for example, a field-programmable gate array) used for processing performed by search server 300. In search server 300, control unit 310 and/or the dedicated integrated circuit are/is an exemplary controller that controls operations by search server 300.

Network I/F 307 allows communication of search server 300 with another apparatus over network NW, and it is implemented, for example, by a network interface card (NIC).

Storage apparatus 309 is a non-volatile storage apparatus implemented, for example, by a hard disk drive (HDD) or a solid state drive (SSD), and a program and/or data are/is stored therein. For example, index 30 can be stored in storage apparatus 309.

Index 30 is information representing a feature of an electronic document stored in file server 400. Search server 300 retrieves an electronic document that satisfies a search condition from file server 400 based on index 30.

[Software Configuration of Search System SYS]

Figure 4:
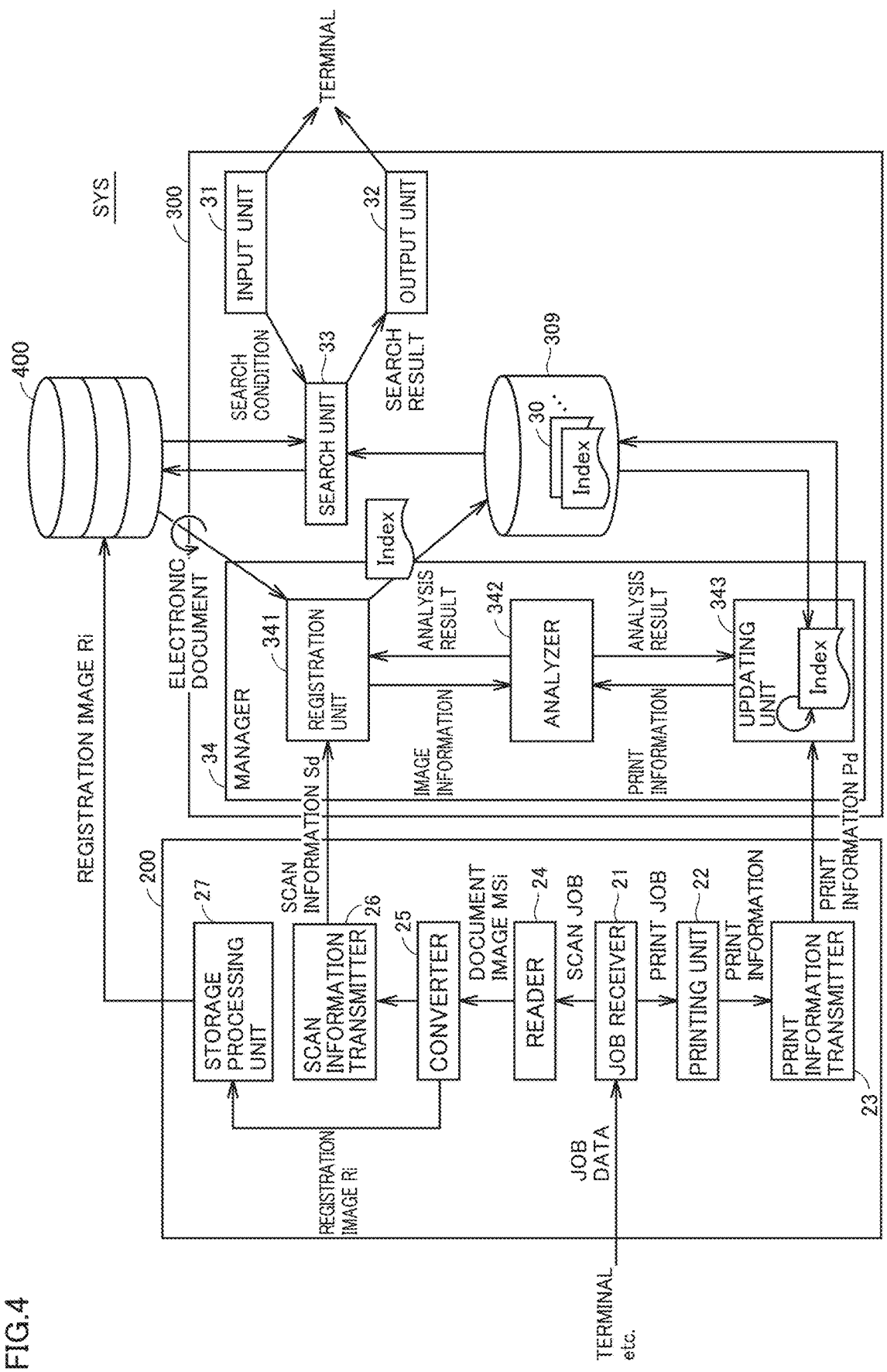
FIG. 4 is a diagram showing a software configuration of search system SYS.

FIG. 4 is a diagram showing a software configuration of search system SYS. Elements shown in FIG. 4 are implemented by execution of respective programs stored in ROM 213 and ROM 313 by CPU 211 of MFP 200 and CPU 311 of search server 300.

(Software Configuration of MFP 200)

As shown in FIG. 4, MFP 200 includes a job receiver 21, a printing unit 22, a print information transmitter 23, a reader 24, a converter 25, a scan information transmitter 26, and a storage processing unit 27.

Job receiver 21 receives job data from terminal 100 communicatively connected to MFP 200 or operation panel 220 of MFP 200. Examples of the job data include job data relating to a print job for performing printing or job data relating to a scan job for reading an image of a document.

When job data relates to a print job, the "job data" includes document data and a control command. The control command includes, for example, setting information. The setting information includes various types of print setting such as a file name of an electronic document to be printed, the number of copies. N-in-one printing, single-sided/double-sided printing, and color/monochrome printing.

When job data relates to a scan job, the "job data" includes a control command. The control command includes, for example, an instruction command to indicate reading of a document and setting information including scan setting such as where the read document is to be stored, a file name at the time of storage, a resolution of the read document, a color mode of the read document, and brightness of the read document.

When the job data relates to a print job, job receiver 21 sends the job data (a print job in the figure) to printing unit 22. When the job data relates to a scan job, job receiver 21 sends the job data (a scan job in the figure) to reader 24.

When the job data is sent from job receiver 21, printing unit 22 processes document data in accordance with a control command included in the job data and performs processing for printing on a recording medium set in MFP 200. More specifically, printing unit 22 converts document data in accordance with print setting to generate image data for printing, and controls print output unit 203 to form an image on a recording medium in accordance with the generated image data.

Terminal 100 can designate an electronic document stored in file server 400 and transmit a print job indicating printing of the designated electronic document to MFP 200. In other words, printing unit 22 can also be concluded as performing processing for printing, in accordance with the print setting, the electronic document stored in file server 400 and designated.

Print information transmitter 23 transmits information on a printed product P (print information Pd in the figure) to search server 300. Information on printed product P is information relating to printed product P, and includes, for example, setting information including print setting or document data for printing obtained by converting document data in accordance with the print setting. The document data for printing may be, for example, image data obtained by reading of an image of a post-print printed product by document reader 202. Print information Pd includes information (for example, a file name) by which a printed electronic document can be identified.

When job data is sent from job receiver 21, reader 24 performs processing for reading an image of a document in response to a control command included in the job data. More specifically, reader 24 controls document reader 202 to take in and scan a document set in MFP 200 and obtains an image of the document (which is also referred to as a document image MSi) read by document reader 202.

Converter 25 converts document image MSi obtained by reader 24 into a registration image Ri to be stored in file server 400 as an electronic document, in accordance with scan setting included in the control command. For example, converter 25 converts document image MSi in accordance with a color mode, a resolution, or brightness included in the setting information to generate registration image Ri.

Scan information transmitter 26 transmits scan information Sd to search server 300. Scan information Sd includes information on document image MSi and information on registration image Ri. Information on document image MSi includes, for example, setting information including scan setting and document image MSi. Information on registration image Ri includes, for example, setting information including scan setting, registration image Ri, and information (a file name or the like) by which where registration image Ri is stored can be identified.

Storage processing unit 27 performs processing for storing registration image Ri in file server 400. For example, storage processing unit 27 transmits a designated file name and registration image Ri to file server 400, in association with each other. File server 400 receives information from storage processing unit 27 so that registration image Ri is stored as an electronic document therein under a designated file name.

(Software Configuration of Search Server 300)

Control unit 310 of search server 300 includes an input unit 31, an output unit 32, a searcher 33, and a manager 34. Manager 34 includes a registration unit 341, an analyzer 342, and an updating unit 343.

Input unit 31 accepts an input of a search condition sent from terminal 100. Input unit 31 sends the accepted search condition to searcher 33. Searcher 33 retrieves an electronic document that satisfies the search condition from file server 400, based on index 30 stored in storage apparatus 309. Searcher 33 sends an obtained search result to output unit 32. Output unit 32 provides the search result sent from search unit 33 to terminal 100.

Manager 34 manages index 30. Index 30 is information representing a feature of an electronic document. In the present embodiment, the feature of the electronic document managed as index 30 includes at least a feature relating to a color shade of the electronic document.

Registration unit 341 registers in storage apparatus 309 as index 30, the feature of the electronic document obtained by analyzing the electronic document. Registration unit 341 periodically accesses file server 400 and registers index 30 corresponding to an electronic document newly stored in file server 400.

When information on document image MSi and information on registration image Ri are sent from scan information transmitter 26, registration unit 341 performs processing for registering the index corresponding to registration image Ri (electronic document) registered as the electronic document in file server 400. Registration unit 341 registers the index corresponding to registration image Ri registered as the electronic document in file server 400, based on the information on document image MSi and the information on registration image Ri.

For example, when the color shade has been changed in conversion of document image MSi into registration image Ri, registration unit 341 registers as index 30 of registration image Ri (electronic document), a feature relating to the color shade of document image MSi in addition to a feature relating to the color shade of registration image Ri.

By doing so, even when the document at hand is different in color shade from the electronic document of the document stored in file server 400 (that is, when the color shade is changed), a user can retrieve the electronic document corresponding the document at hand, based on his/her image of the color shade held for the document.

Analyzer 342 analyzes the electronic document and the like to analyze the color shade of each of the electronic document, document image MSi, registration image Ri, and a printed product. A detailed analysis method will be described later.

Updating unit 343 updates index 30 registered in storage apparatus 309. For example, when information on printed product P is sent from print information transmitter 23, updating unit 343 updates index 30 of the electronic document corresponding to the printed product.

For example, when a color shade different from the color shade of the electronic document is designated and that electronic document is printed, updating unit 343 updates index 30 so as to additionally register the feature of the color shade of the obtained printed product as index 30 of the electronic document.

By doing so, even though the printed product at hand is different in color shade from the electronic document stored in file server 400 (that is, when the color shade is changed), the user can retrieve the electronic document corresponding to the printed product at hand based on his/her image of the color shade held for the printed product.

Updating unit 343 may periodically access file server 400, determine whether or not the electronic document stored in file server 400 has been updated, and update index 30 corresponding to the updated electronic document. In this case, updating unit 343 may rewrite index 30 itself corresponding to the updated electronic document to new index 30.

[Series of Processing Performed in Printing]

Figure 5:
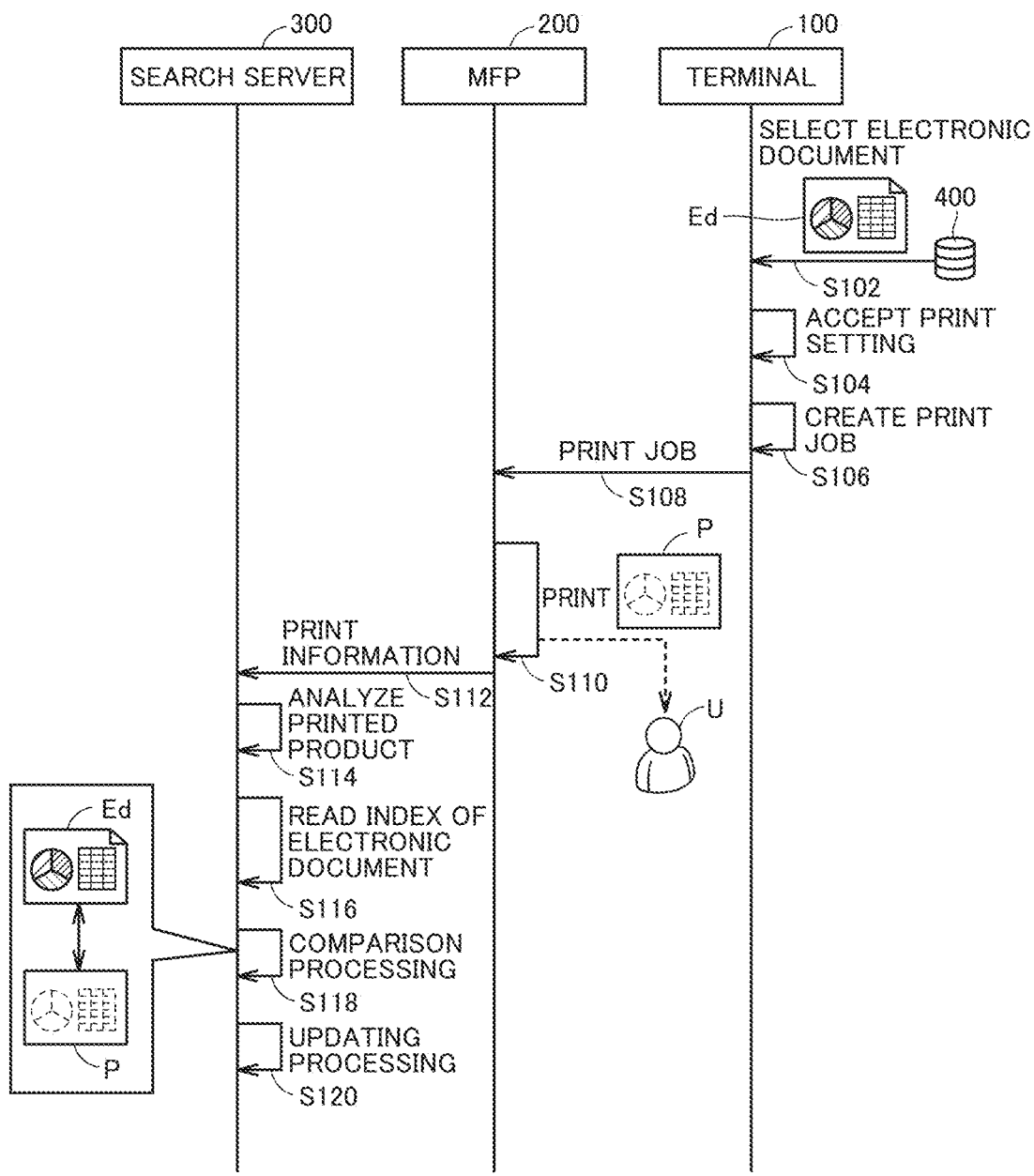
FIG. 5 is a sequence chart showing an exemplary series of operations performed in search system SYS in printing an electronic document stored in a file server 400.

An exemplary series of processing performed in printing will be described with reference to FIG. 5. FIG. 5 is a sequence chart showing an exemplary series of operations performed in search system SYS in printing an electronic document stored in file server 400.

In S102, it is assumed that electronic document Ed in file server 400 has been selected.

In S104, terminal 100 accepts setting relating to printing.

In S106, terminal 100 creates a print job based on the setting accepted in S104 and selected electronic document Ed.

In S108, terminal 100 transmits the print job created in S106 to MFP 200.

In S110, MFP 200 prints electronic document Ed in accordance with the print job sent in S106. Printed product P is thus passed to a user U.

In S112, MFP 200 sends print information Pd to search server 300. Print information Pd is information on printed product P and will be described later with reference to FIGS. 7 and 8. Print information Pd includes identification information ID by which printed electronic document Ed can be identified.

In S114, search server 300 analyzes printed product P based on print information Pd sent in S112 and extracts a feature of a color shade of printed product P. Details of an analysis method will be described with reference to FIGS. 9 to 13.

In S116, search server 300 reads from storage apparatus 309, index 30 of electronic document Ed based on identification information ID included in print information Pd sent in S112.

In S118, search server 300 compares the color shade of electronic document Ed on which printing is based with the color shade of printed product P obtained by printing of electronic document Ed in accordance with print setting, based on index 30 of electronic document Ed read in S116 and print information Pd sent in S112 (or the feature of the color shade of printed product P extracted in S114).

In S120, when the color shade of printed product P is different from the color shade of electronic document Ed, search server 300 updates index 30 of electronic document Ed based on print information Pd. A specific updating method will be described later with reference to FIGS. 14 to 16.

[Series of Processing Performed in Search]

Figure 6:
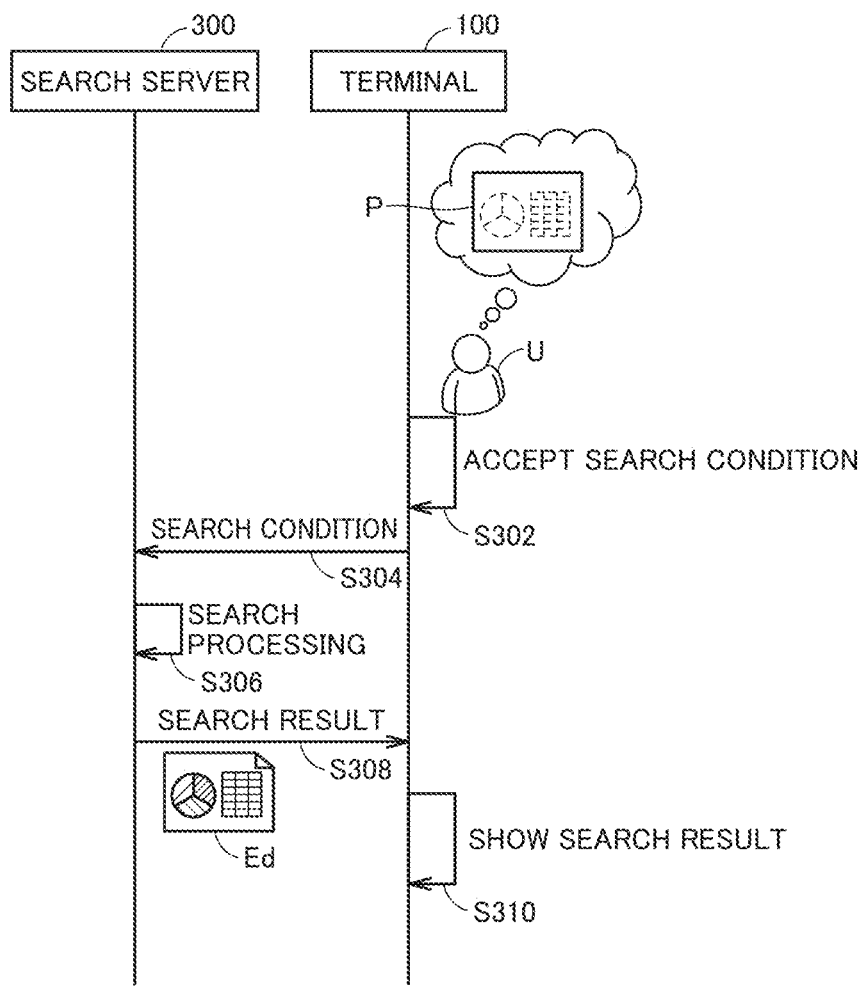
FIG. 6 is a sequence chart showing an exemplary series of operations performed in search system SYS in searching for an electronic document.

An exemplary series of processing performed in search will be described with reference to FIG. 6. FIG. 6 is a sequence chart showing an exemplary series of operations performed in search system SYS in searching for an electronic document.

In S302, terminal 100 accepts a search condition. Tt is assumed that, at this time, a user enters information on the color shade of printed product P as the search condition based on his/her image of printed product P by way of example.

In S304, terminal 100 sends the search condition accepted in S302 to search server 300.

In S306, search server 300 retrieves electronic document Ed that satisfies the search condition sent in S304 based on index 30.

In S308, terminal 100 sends a result of search in S306 to terminal 100. For example, in the example shown in FIG. 6, terminal 100 sends electronic document Ed that satisfies the search condition to terminal 100. In S310, terminal 100 shows the obtained result of search.

In the present embodiment, when electronic document Ed is printed, index 30 of electronic document Ed is updated based on print information Pd. Therefore, even when the color shade of printed product P is different from the color shade of electronic document Ed, electronic document Ed can be retrieved by entering information on the color shade of printed product P as the search condition.

[Print Information Pd]

Figure 7:
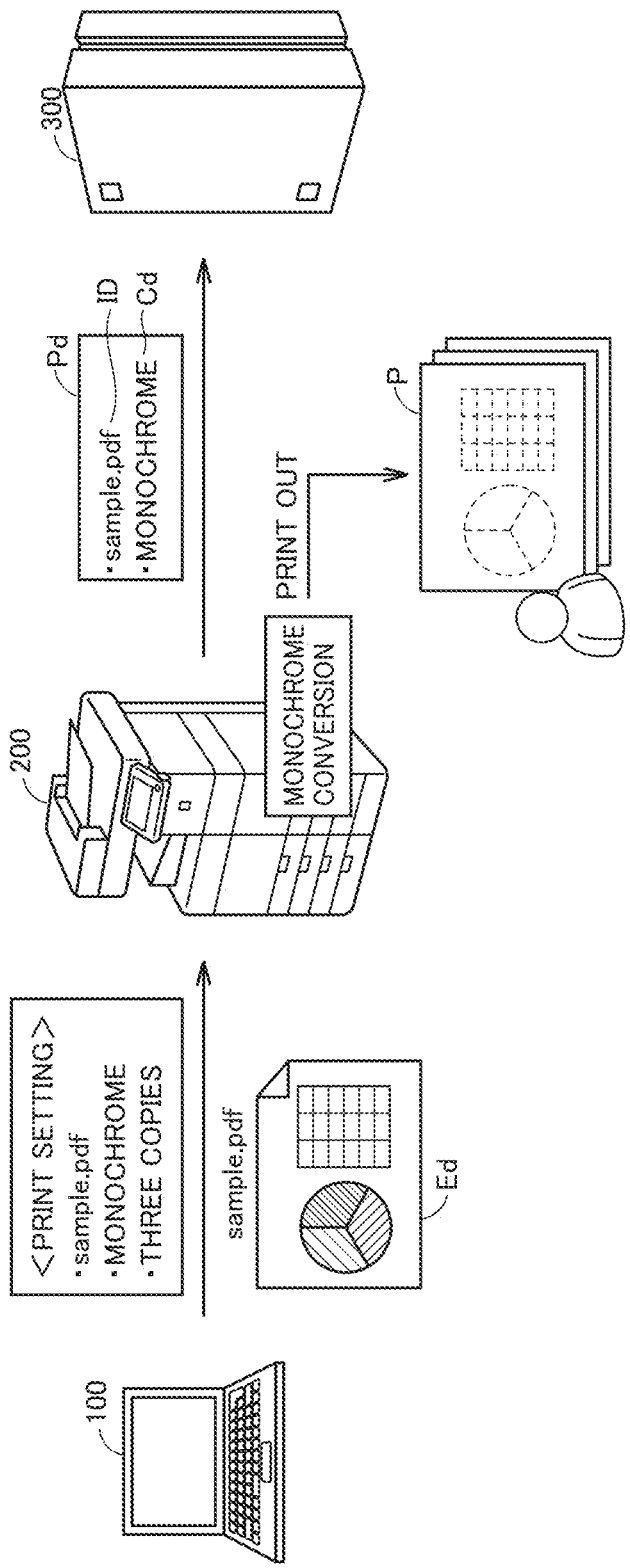
FIGS. 7 and 8 are diagrams for illustrating exemplary print information Pd.
Figure 8:
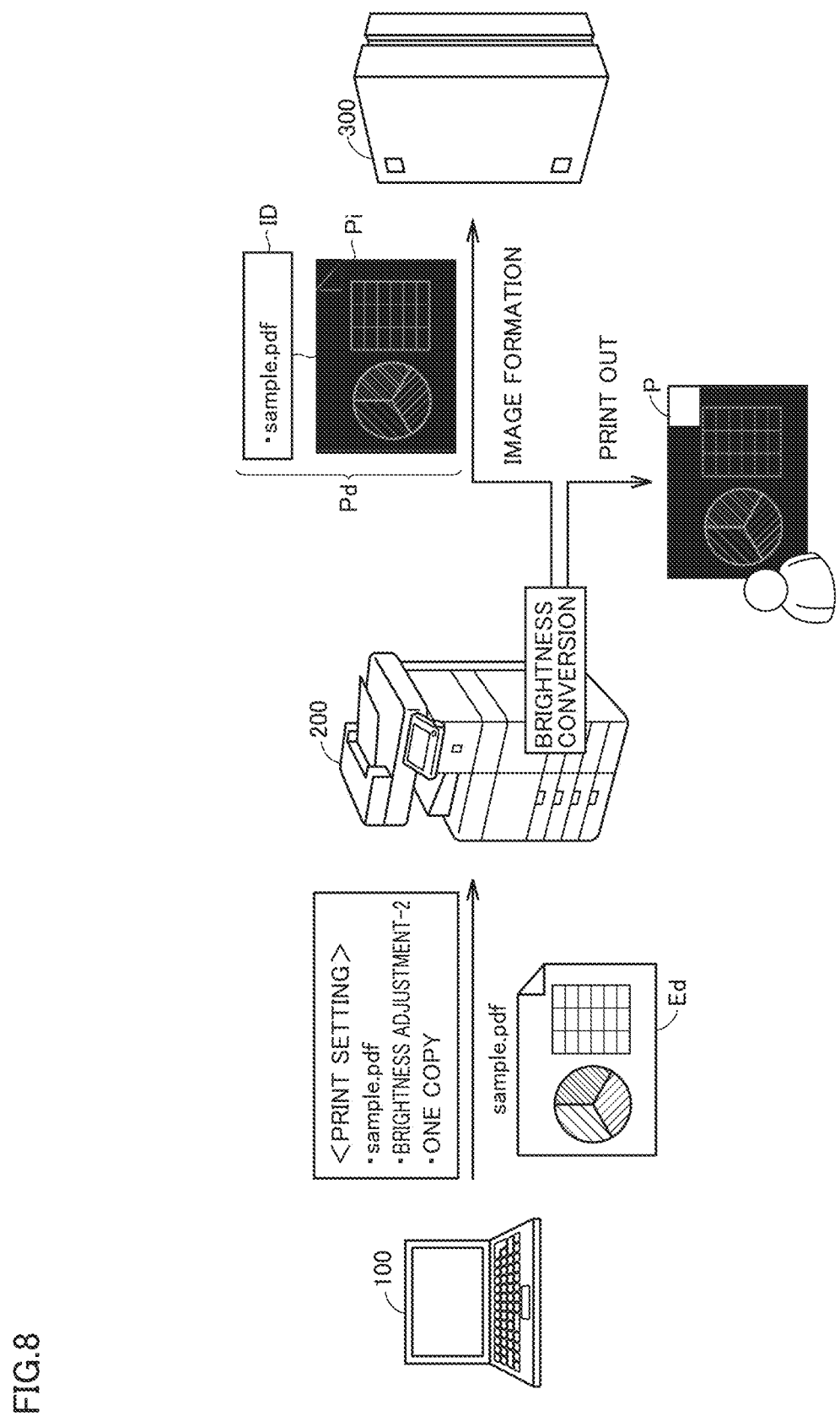

Print information Pd will be described with reference to FIGS. 7 and 8. FIGS. 7 and 8 are diagrams for illustrating exemplary print information Pd.

As shown in FIG. 7, MFP 200 may send setting information Cd to search server 300 as print information Pd. Setting information Cd is information by which print setting made in printing electronic document Ed can be identified, and it is, for example, information representing color/monochrome printing and quality (resolution, brightness, density, or the like) of an image to be printed.

As shown in FIG. 8, MFP 200 may transmit a printed image Pi as print information Pd. Printed image Pi is, for example, an image generated based on setting accepted by MFP 200 in printing and electronic document Ed. Printed image Pi may be an image obtained by reading printed product P with document reader 202.

In any case, MFP 200 transmits to search server 300, print information Pd including identification information ID by which printed electronic document Ed can be identified. In the example shown in FIGS. 7 and 8, MFP 200 sends a file name to search server 300 as identification information ID.

MFP 200 may send both of setting information Cd and printed image Pi to search server 300 as print information Pd. In the present embodiment, print information Pd should only include at least information on the color shade of printed product P, and may include, for example, information on the number of copies of printed products, information on a user who has performed printing, the number of pages to be printed on one sheet, single-sided/double-sided printing, and an area of a printed page.

When setting information Cd alone is transmitted as print information Pi, an amount of transmitted information can advantageously be reduced. In addition, when setting information Cd alone is transmitted as print information Pd, processing load imposed on search server 300 can advantageously be lowered.

When printed image Pi is transmitted as print information Pd, search server 300 can advantageously analyze the color shade of printed product P in further detail. For example, even when setting is supposed to cause no change in color shade, the color shade may be different between electronic document Ed and printed product P due to color shade reproducibility of MFP 200. Even in such a case, by transmitting printed image Pi, search server 300 can update index 30 assuming that the color shade has been changed.

[Processing Performed by Analyzer 342]

An exemplary method of analysis of electronic document Ed or the like by analyzer 342 and exemplary index 30 obtained by the analysis method will be described with reference to FIGS. 9 to 13.

First Example of Method of Analysis by Analyzer 342

Figure 9:
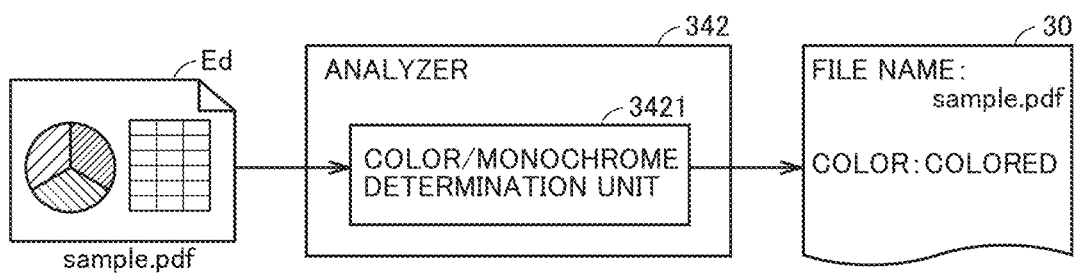
FIG. 9 is a diagram for illustrating a first example of a method of analysis by an analyzer 342.

FIG. 9 is a diagram for illustrating a first example of a method of analysis by analyzer 342. Analyzer 342 includes a color/monochrome determination unit 3421. Color/monochrome determination unit 3421 analyzes electronic document Ed to determine whether electronic document Ed is a colored document or a monochrome document.

When printed image Pi is sent as print information Pd, analyzer 342 may analyze printed image Pi to determine whether printed image Pi is a colored image or a monochrome image by means of color/monochrome determination unit 3421. Similarly, when a scan job is executed and document image MSi obtained by reader 24 is sent or when registration image Ri obtained by conversion of document image MSi by converter 25 is analyzed, analyzer 342 may make color/monochrome determination based on document image MSi or registration image Ri.

For example, when an analysis target is image data, color/monochrome determination unit 3421 calculates color saturation and brightness of each pixel from gray scale data of pixels within the image. Analyzer 342 counts the number of pixels having color saturation equal to or larger than a prescribed threshold value as colored pixels, and when the number of colored pixels is equal to or larger than the prescribed threshold value, it determines that the analysis target is colored. The threshold value for determining whether or not a pixel is a colored pixel may be set based on calculated brightness.

Processing performed by color/monochrome determination unit 3421 is by way of example. For example, when electronic document Ed is a file different in format from image data such as data including text information and diagrams such as a Word file or an Excel file, color/monochrome determination may be made with another method.

When color/monochrome determination unit 3421 makes color/monochrome determination, information representing whether a file to be analyzed is colored or monochrome may be registered as index 30.

When color/monochrome determination unit 3421 analyzes electronic document Ed (or printed image Pi) including a plurality of pages, it may make color/monochrome determination for each page or for the plurality of pages as a whole.

When color/monochrome information is thus registered as index 30, searcher 33 can conduct search in accordance with a search condition such as a "monochrome document."

(Second Example of Method of Analysis by Analyzer 342)

Figure 10:
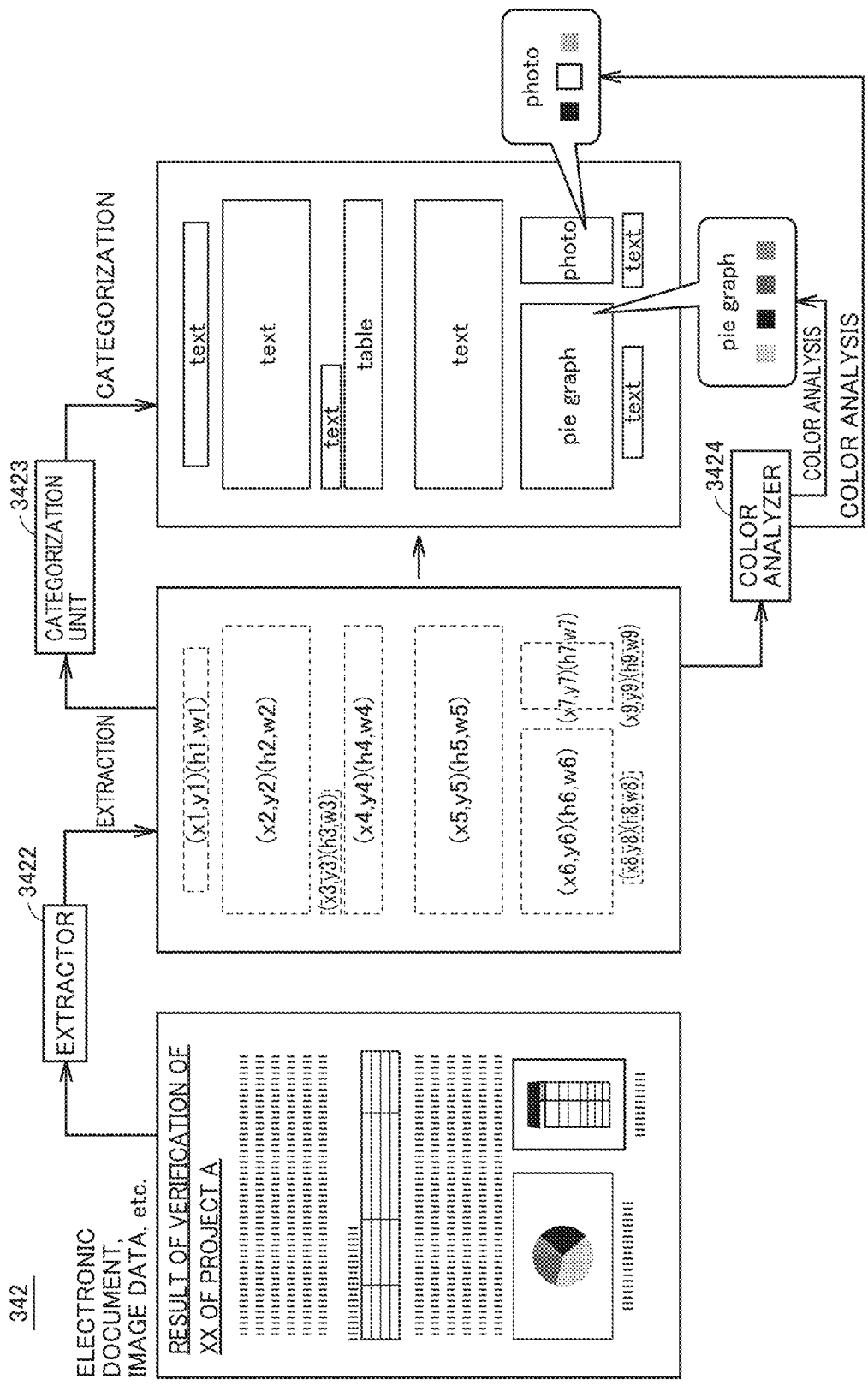
FIG. 10 is a diagram for illustrating a second example of the method of analysis by analyzer 342.

FIG. 10 is a diagram for illustrating a second example of the method of analysis by analyzer 342. FIG. 11 is a diagram showing exemplary index 30 obtained in analysis with the analysis method shown in FIG. 10.

Analyzer 342 includes an extractor 3422, a categorization unit 3423, and a color analyzer 3424. Analyzer 342 analyzes for each page, electronic document Ed to be analyzed.

Extractor 3422 extracts each object included in a page in accordance with a distance between pieces of information within a page or a size of information.

Categorization unit 3423 categorizes a type of objects extracted by extractor 3422, for each object. For example, categorization unit 3423 categorizes each object into text, chart, graph, or photograph.

Color analyzer 3424 analyzes for each object extracted by extractor 3422, a color used for that object.

When an object is thus extracted and a color and a type are found for each object, as shown in FIG. 11, class information Cl representing a type of the object, position information Lo representing a position of the object, and color information Co representing a color used for the object are registered as index 30.

In analyzing a color used for an object, color analyzer 3424 may simply analyze whether a pixel is colored or monochrome as is done by color/monochrome determination unit 3421, and when the pixel is colored, it may analyze in further detail specifically which color is used.

Though an example in which an analysis target is electronic document Ed is described with reference to FIGS. 10 and 11, the analysis target may be printed image Pi, document image MSi, or registration image Ri.

When class information Cl and color information Co are thus registered as index 30, searcher 33 can conduct search in accordance with a search condition such as "including a colorful pie graph."

Third Example of Method of Analysis by Analyzer 342

Figure 12:
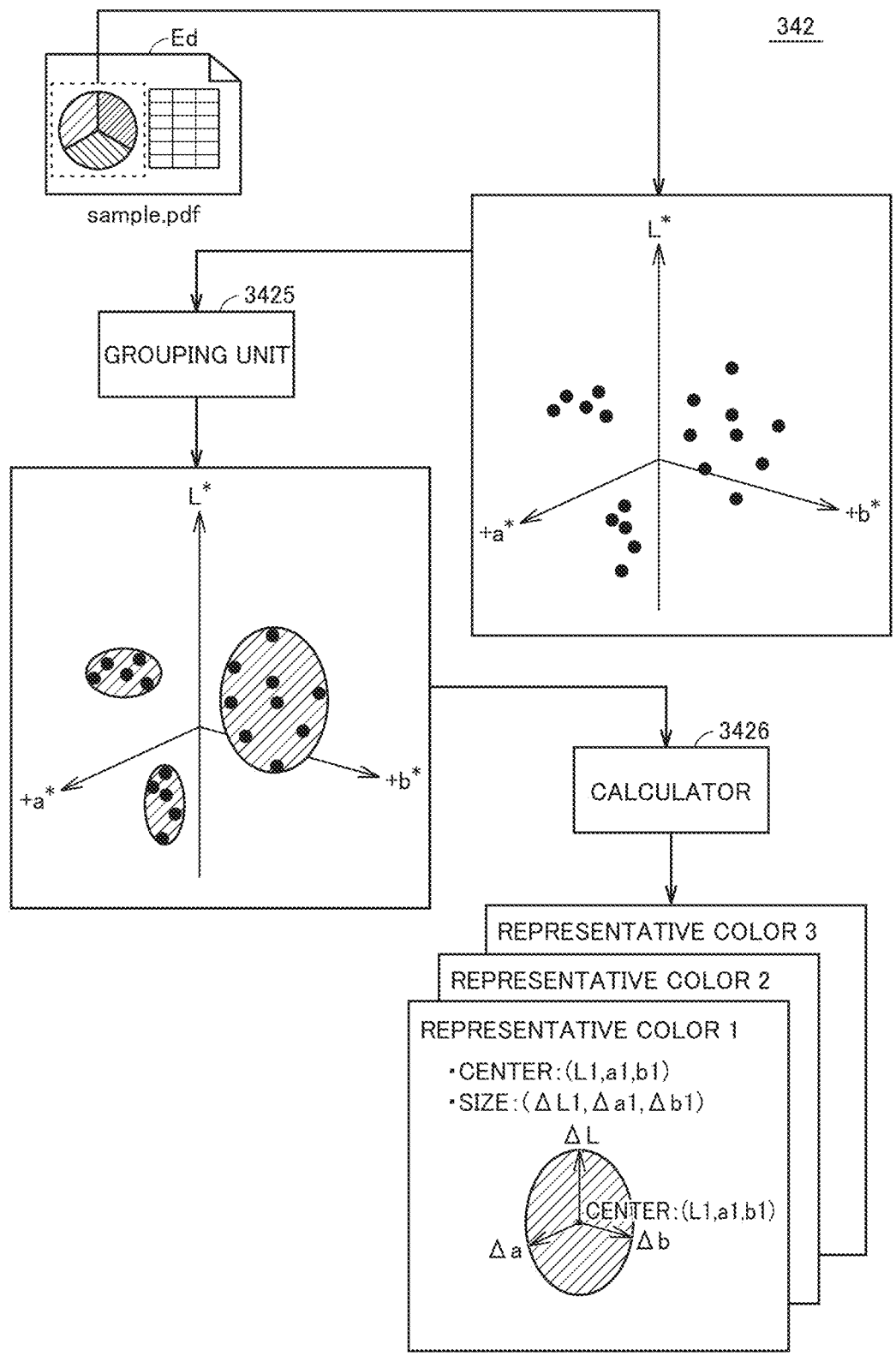
FIG. 12 is a diagram for illustrating a third example of the method of analysis by analyzer 342.

FIG. 12 is a diagram for illustrating a third example of the method of analysis by analyzer 342. FIG. 13 is a diagram showing exemplary index 30 obtained in analysis with the analysis method shown in FIG. 12.

Analyzer 342 includes a grouping unit 3425 and a calculator 3426. Analyzer 342 may analyze a plurality of pages of electronic document Ed to be analyzed as a whole, for each page, or for each object. In the example shown in FIG. 12, analyzer 342 analyzes the electronic document for each object.

For example, a color used for one object included in electronic document Ed can be expressed in a color space. Any color space can be employed as the color space, and for example, a color space such as RGB, CMY, L*a*b*, or Lab can be employed.

Grouping unit 3425 groups colors used for an object into groups of similar colors. More specifically, grouping unit 3425 groups gray scale data of pixels within an object into groups of colors short in distance to one another in the color space.

Calculator 3426 calculates a gray scale value defined as the center of each similar-color group resulting from grouping by grouping unit 3425 and a distribution range (dynamic range). Thus, a feature of the similar-color group (a gray scale value defined as the center and the distribution range) is found for each similar-color group (representative colors 1, 2, and 3 in the figure).

As the feature for each similar-color group is thus found, similar-color information Gr including calculation information Ca calculated by calculator 3426 is registered as index 30. In other words, the gray scale value and the distribution range (dynamic range) for each similar-color group are registered as index 30.

In the example shown in FIG. 12, analyzer 342 is assumed to conduct analysis for each object. In other words, grouping unit 3425 and calculator 3426 are described as specific examples of color analyzer 3424 shown in FIG. 10, and description is given on the premise that analyzer 342 includes extractor 3422 and categorization unit 3423. Analyzer 342 may include only grouping unit 3425 and calculator 3426. For example, analyzer 342 may conduct analysis by means of grouping unit 3425 and calculator 3426 for each page or for each electronic document Ed, rather than for each object.

Though description is given with reference to FIGS. 12 and 13 assuming that an analysis target is electronic document Ed, the analysis target may be printed image Pi, document image MSi, or registration image Ri.

As the gray scale value and the distribution range for each similar-color group are thus registered as index 30, searcher 33 can conduct search in accordance with a search condition such as "use of red as a main color."

[Processing Performed by Updating Unit 343]

A method of update of index 30 by updating unit 343 will be described with reference to FIGS. 14 to 16.

First Example of Method of Update by Updating Unit 343

Figure 14:
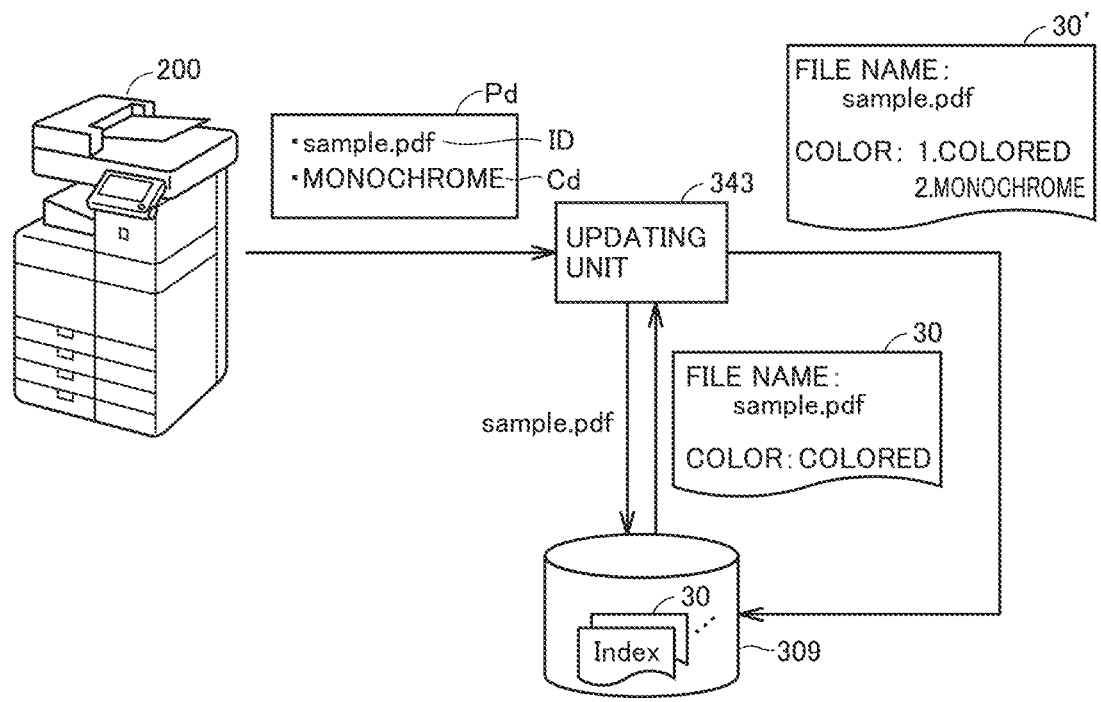
FIG. 14 is a diagram for illustrating a first example of a method of update by an updating unit 343.

FIG. 14 is a diagram for illustrating a first example of a method of update by updating unit 343. In the example shown in FIG. 14, it is assumed that setting information Cd is transmitted as print information Pd.

Updating unit 343 updates index 30 based on setting information Cd and has an index 30' stored in storage apparatus 309.

More specifically, updating unit 343 reads index 30 corresponding to identification information ID, based on identification information ID included in print information Pd. Updating unit 343 compares setting information Cd with read index 30, and compares the color shade of electronic document Ed registered as index 30 with the color shade of printed product P obtained from setting information Cd (contents of setting relating to the color shade in the print setting sent as setting information Cd). Updating unit 343 updates index 30 by adding a difference between the color shade of electronic document Ed and the color shade of printed product P to index 30.

For example, in the example shown in FIG. 14, it is assumed that colored electronic document Ed is printed in monochrome. In this case, updating unit 343 additionally registers in index 30, information "monochrome" which is a difference between the color shade of electronic document Ed and the color shade of printed product P.

As the difference between the color shade of electronic document Ed and the color shade of printed product P is thus additionally registered in index 30 based on setting information Cd, only information on the changed color shade is added. Therefore, increase in amount of information of index 30 can be prevented.

For example, when one electronic document Ed is printed by various users and when information on each printed product P printed by each user is additionally registered in index 30, an amount of information of index 30 increases and a capacity of storage apparatus 309 becomes scarce. By adding only information on the changed color shade, however, increase in amount of information of index 30 can be prevented.

Second Example of Method of Update by Updating Unit 343

Figure 15:
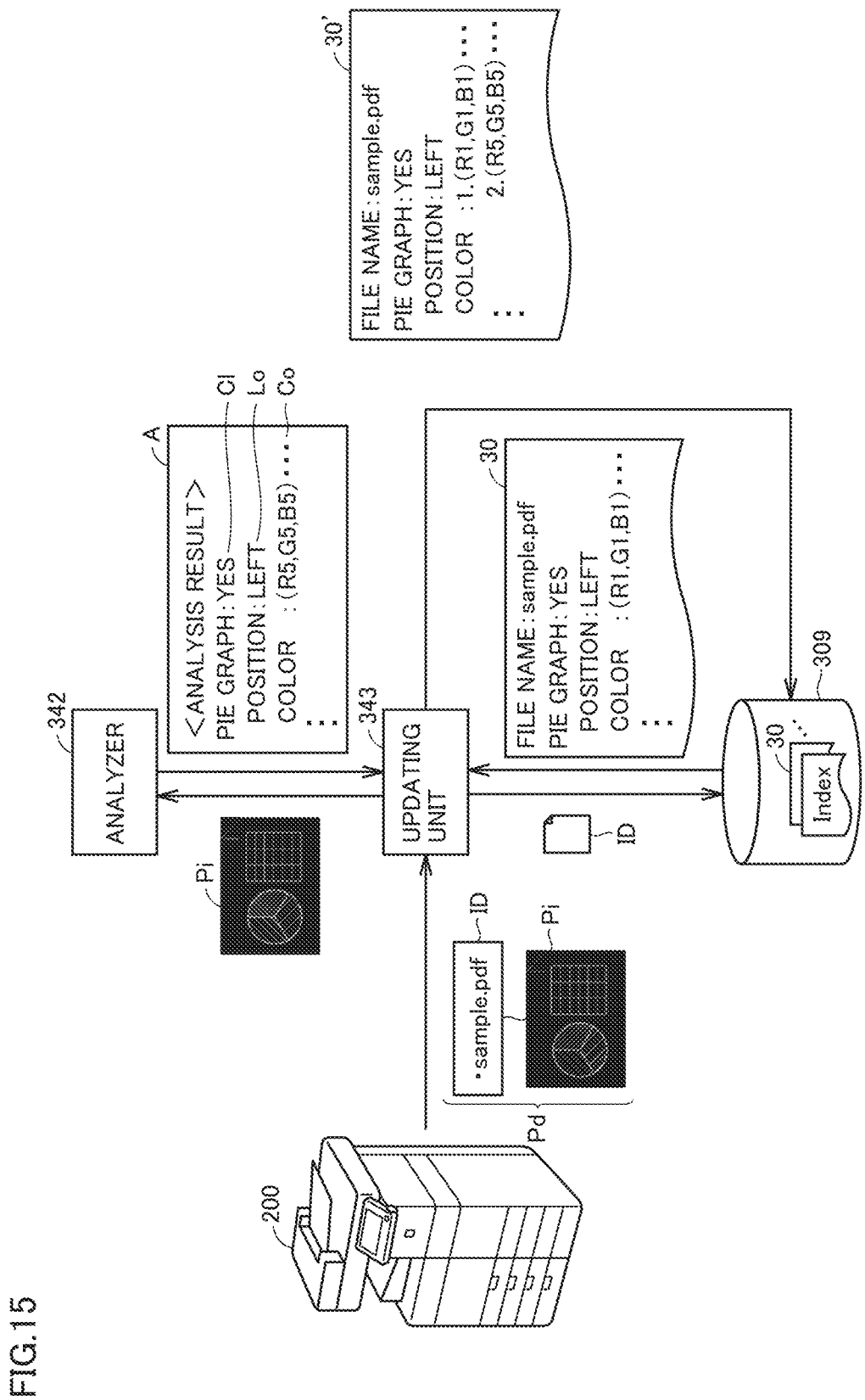
FIG. 15 is a diagram for illustrating a second example of a method of update by an updating unit 343.

FIG. 15 is a diagram for illustrating a second example of the method of update by updating unit 343. In the example shown in FIG. 15, it is assumed that printed image Pi is transmitted as print information Pd. In the example shown in FIG. 15, description is given assuming that analyzer 342 includes extractor 3422, categorization unit 3423, and color analyzer 3424.

Updating unit 343 has index 30' stored in storage apparatus 309, index 30' being an index obtained by additionally registering in index 30, a difference between a result of analysis obtained by analysis of printed image Pi by analyzer 342 and an analysis result obtained by analysis of electronic document Ed by analyzer 342 (the analysis result registered as index 30).

More specifically, updating unit 343 reads index 30 corresponding to identification information ID, based on identification information ID included in print information Pd. Updating unit 343 determines an analysis item based on information on the color shade registered in index 30. Updating unit 343 sends printed image Pi to analyzer 342 and sends the determined analysis item to analyzer 342. Analyzer 342 analyzes printed image Pi in respect of the sent analysis item and sends an analysis result A to updating unit 343. Updating unit 343 compares analysis result A with read index 30, calculates a difference between the color shade of printed image Pi and the color shade of electronic document Ed, and additionally registers the calculated difference in index 30.

For example, in the example shown in FIG. 15, determining that a color of a pie graph has been changed, updating unit 343 additionally registers a color in the pie graph.

As the difference between the color shade of electronic document Ed and the color shade of printed product P is thus additionally registered in index 30, information on the changed color shade alone is added. Therefore, increase in amount of information of index 30 can be prevented.

Updating unit 343 can obtain the color shade for each object included in each page of printed image Pi, by having analyzer 342 analyze printed image Pi rather than setting information Cd. In this case, even when the color shade for each object is registered as index 30, updating unit 343 can find the difference between the color shades for each object. Thus, by having analyzer 342 analyze printed image Pi to find the difference between the color shades, change in color shade can be analyzed in further detail.

Third Example of Method of Update by Updating Unit 343

Figure 16:
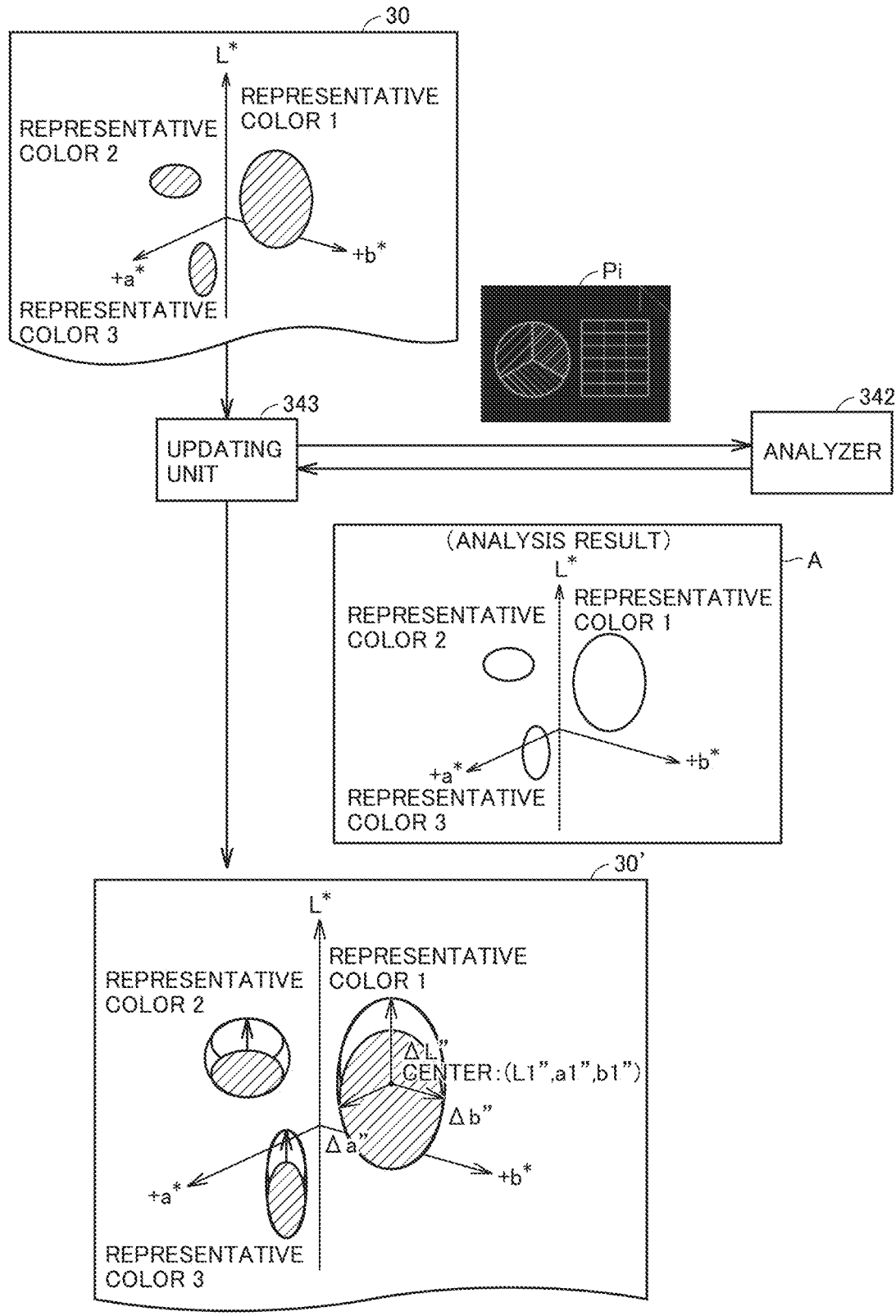
FIG. 16 is a diagram for illustrating a third example of the method of update by updating unit 343.

FIG. 16 is a diagram for illustrating a third example of the method of update by updating unit 343. In the example shown in FIG. 16, it is assumed that printed image Pi is transmitted as print information Pd. In the example shown in FIG. 16, description is given assuming that analyzer 342 includes grouping unit 3425 and calculator 3426.

Updating unit 343 changes calculation information Ca (the gray scale value and the distribution range) for each similar-color group registered as index 30 based on calculation information Ca (the gray scale value and the distribution range) for each similar-color group included in printed image Pi and has resultant index 30' stored in storage apparatus 309.

More specifically, updating unit 343 reads index 30 corresponding to identification information ID, based on identification information ID included in print information Pd. Updating unit 343 determines the analysis item based on information on the color shade registered in index 30. Updating unit 343 sends printed image Pi to analyzer 342 and sends the determined analysis item to analyzer 342. Analyzer 342 analyzes printed image Pi in respect of the sent analysis item and sends analysis result A to updating unit 343. Updating unit 343 compares analysis result A with read index 30, updates each similar-color group such that each similar-color group registered as index 30 includes a similar-color group included in printed image Pi, and calculates again the gray scale value defined as the center of the similar-color group and the distribution range (dynamic range) for each updated similar-color group. The gray scale value and the distribution range (dynamic range) calculated again are registered as index 30'.

By doing so, when the color shade is generally made brighter or darker in electronic document Ed and printed product P, an amount of information of index 30 can be smaller than in registration with the difference in color being added.

[Modification of MFP 200]

Figure 17:
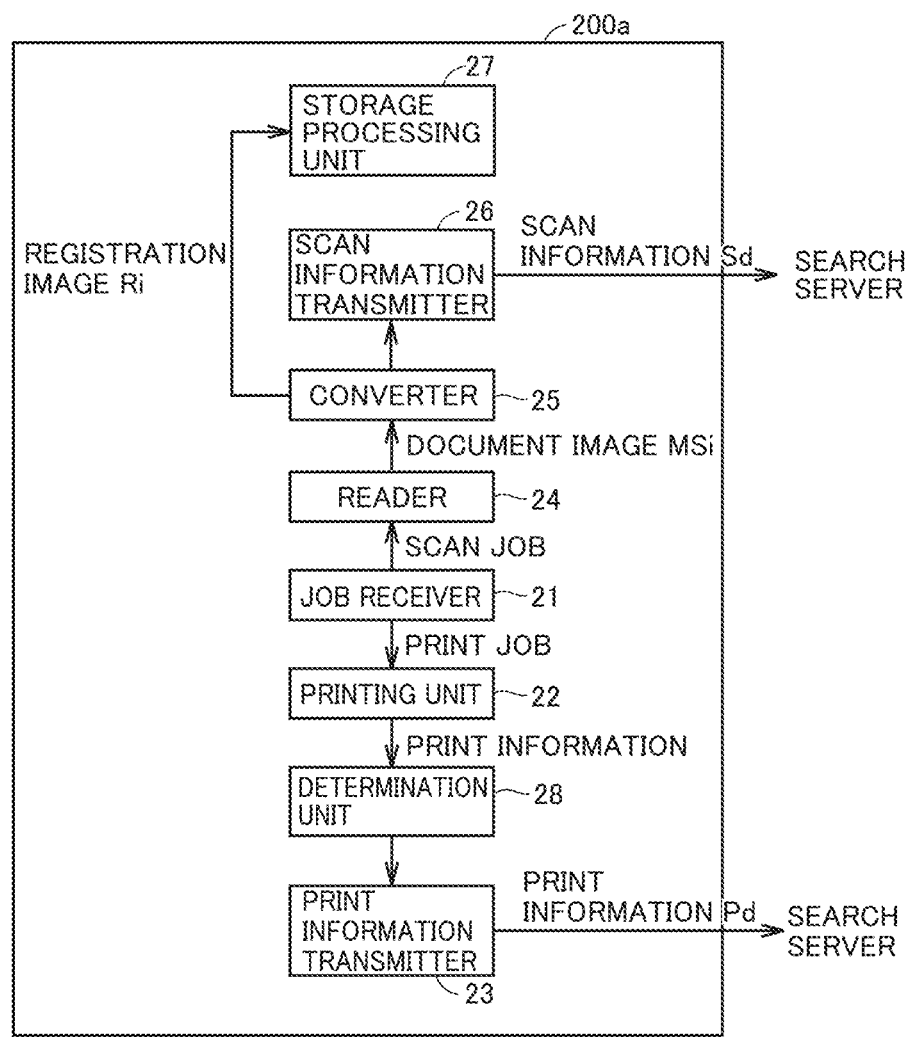
FIG. 17 is a block diagram showing a software configuration of an MFP 200a according to a modification.
Figures 18, 19:
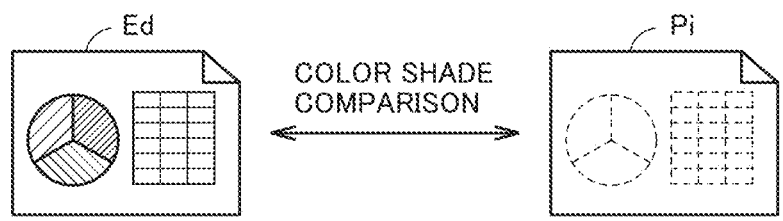
FIGS. 18 and 19 are diagrams for illustrating an exemplary determination method.

An MFP 200a according to a modification will be described with reference to FIGS. 17 to 19. FIG. 17 is a block diagram showing a software configuration of MFP 200a according to the modification. FIGS. 18 and 19 are diagrams for illustrating an exemplary determination method.

In the embodiment, print information transmitter 23 is assumed to transmit print information Pd to search server 300 regardless of whether or not the color shade has been changed between electronic document Ed and printed product P. MFP 200a according to the modification is different from MFP 200 according to the embodiment in further including a determination unit 28 that determines whether or not the color shade is different between electronic document Ed and printed product P. Determination unit 28 will be described below.

Determination unit 28 determines whether or not the color shade is different between electronic document Ed and printed product P. When determination unit 28 determines that the color shade is different between electronic document Ed and printed product P, it instructs print information transmitter 23 to send print information Pd to search server 300. When determination unit 28 determines that the color shade is not different between electronic document Ed and printed product P, it does not instruct print information transmitter 23 to send print information Pd to search server 300.

In other words, when determination unit 28 determines that the color shade is different between electronic document Ed and printed product P, print information transmitter 23 transmits print information Pd to search server 300. When determination unit 28 determines that the color shade is not different between electronic document Ed and printed product P, print information transmitter 23 does not transmit print information Pd to search server 300.

MFP 200a can thus transmit print information Pd to search server 300 as necessary.

Search server 300 may include determination unit 28. In this case, determination unit 28 may compare print information Pd with index 30 corresponding to identification information ID included in print information Pd and determine whether or not the color shade is different between electronic document Ed and printed product P. When determination unit 28 determines that the color shade is different between electronic document Ed and printed product P, updating unit 343 may update index 30. Updating unit 343 can thus update index 30 as necessary.

A method of determination by determination unit 28 will be described with reference to FIGS. 18 and 19. Referring to FIG. 18, determination unit 28 may determine whether or not the color shade is different between electronic document Ed and printed product P by comparing electronic document Ed and printed image Pi with each other.

Referring to FIG. 19, determination unit 28 may determine whether or not setting for a setting item accompanied by change in predetermined color shade has been made, based on setting information Cd. When determination unit 28 determines that setting for the setting item accompanied by change in color shade has been made, it may determine that the color shade is different between electronic document Ed and printed product P.

Other Modifications

In the embodiment, only when the color shade is different between electronic document Ed and printed product P, updating unit 343 updates index 30. Updating unit 343 may additionally register in index 30, the feature relating to the color shade of printed product P obtained based on print information Pd, without determining whether or not the color shade is different between electronic document Ed and printed product P.

Each function performed by each apparatus included in search system SYS can arbitrarily be combined. For example, some or all of functions of search server 300 may be performed by file server 400, or some or all of functions of MFP 200 may be performed by search server 300. More specifically, a function of analyzer 342 may be performed by MFP 200. Storage apparatus 309 may be configured as being separate from search server 300. Though search system SYS includes MFP 200 that performs both of functions of the image forming apparatus and the scanner, the image forming apparatus and the scanner may be provided as separate apparatuses.

Although embodiments of the present invention have been described and illustrated in detail, the disclosed embodiments are made for the purposes of illustration and example only and not limitation. The scope of the present invention should be interpreted by terms of the appended claims.

What is claimed is:

1. A search system that searches a storage where one electronic document or a plurality of electronic documents is/are stored for an electronic document that satisfies an entered search condition, the search system comprising:
a first processor; and
a second processor, wherein
the first processor
manages a feature relating to a color shade of the electronic document as an index of the electronic document, and
retrieves the electronic document that satisfies the search condition from the storage based on the index,
the second processor has the electronic document printed in accordance with print setting including setting relating to the color shade in printing the electronic document,
managing a feature relating to a color shade of the electronic document as an index of the electronic document includes
registering as the index of the electronic document, the feature relating to the color shade of the electronic document obtained by analyzing the electronic document, and
updating, when the electronic document is printed, the index of the electronic document based on information on a printed product of the electronic document.

2. The search system according to claim 1, wherein
the second processor further determines whether the color shade is different between the electronic document and the printed product.

3. The search system according to claim 2, further comprising:
a search apparatus including the first processor; and
an image forming apparatus including the second processor, wherein
when it is determined that the color shade is different between the electronic document and the printed product, the image forming apparatus sends the information on the printed product to the search apparatus.

4. The search system according to claim 2, wherein
the updating the index of the electronic document based on information on a printed product of the electronic document further includes updating the index of the electronic document based on the information on the printed product of the electronic document when it is determined that the color shade is different between the electronic document and the printed product.

5. The search system according to claim 1, wherein
the managing a feature relating to a color shade of the electronic document as an index of the electronic document further includes analyzing the color shade of the electronic document based on the electronic document.

6. The search system according to claim 5, wherein
the analyzing the color shade of the electronic document based on the electronic document further includes determining whether the electronic document is colored or monochrome.

7. The search system according to claim 5, wherein
the analyzing the color shade of the electronic document based on the electronic document further includes
extracting an object within the electronic document,
categorizing a type of each of one extracted object or a plurality of extracted objects, and
analyzing a color used in each of the one extracted object or the plurality of extracted objects, and
the registering as the index of the electronic document, the feature relating to the color shade of the electronic document obtained by analyzing the electronic document further includes registering as the index, the type of the object brought in correspondence with each of the one object or the plurality of objects and the color used in the object.

8. The search system according to claim 5, wherein
the analyzing the color shade of the electronic document based on the electronic document further includes
grouping colors used in the electronic document into groups of similar colors, and
calculating a gray scale value defined as a center of grouped similar colors and a distribution range, and
the registering as the index of the electronic document, the feature relating to the color shade of the electronic document obtained by analyzing the electronic document further includes registering as the index, the gray scale value and the distribution range for each similar-color group.

9. The search system according to claim 1, wherein
the information on a printed product is the print setting.

10. The search system according to claim 9, wherein
the updating the index of the electronic document based on information on a printed product of the electronic document further includes additionally registering in the index, a difference between the color shade of the electronic document and the color shade of the printed product obtained based on the print setting.

11. The search system according to claim 1, wherein
the information on a printed product is image data of the printed product.

12. The search system according to claim 6, wherein
the information on a printed product is image data of the printed product, the analyzing the color shade of the electronic document based on the electronic document further analyzes the color shade of the printed product based on the image data of the printed product, and the updating the index of the electronic document based on information on a printed product of the electronic document further includes additionally registering in the index, a difference between a result of analysis of the color shade of the printed product and a result of analysis of the color shade of the electronic document.

13. The search system according to claim 8, wherein
the information on a printed product is image data of the printed product, the analyzing the color shade of the electronic document based on the electronic document further analyzes the color shade of the printed product based on the image data of the printed product, and the updating the index of the electronic document based on information on a printed product of the electronic document further includes changing the gray scale value and the distribution range for each similar-color group registered as the index based on the gray scale value and the distribution range for each similar-color group included in the image data of the printed product obtained based on the image data of the printed product.

\* \* \* \* \*